(12) United States Patent
Wu et al.

(10) Patent No.: US 11,378,462 B2
(45) Date of Patent: Jul. 5, 2022

(54) WATERPROOF THERMOMETER FOR MONITORING FOOD TEMPERATURES DURING COOKING PROCESS

(71) Applicant: GRANDEX INTERNATIONAL CORPORATION, New Taipei (TW)

(72) Inventors: Chwan-Chia Wu, New Taipei (TW); Mendel Lin, Montrose, CA (US)

(73) Assignee: GRANDEX INTERNATIONAL CORPORATION, New Taipei (TW)

( * ) Notice: Subject to any disclaimer, the term of this patent is extended or adjusted under 35 U.S.C. 154(b) by 339 days.

(21) Appl. No.: 16/773,108

(22) Filed: Jan. 27, 2020

(65) Prior Publication Data
US 2021/0231503 A1 Jul. 29, 2021

(51) Int. Cl.
 *G01K 1/08* (2021.01)
 *G01K 7/22* (2006.01)
 *G01K 1/024* (2021.01)
 *G01K 13/00* (2021.01)

(52) U.S. Cl.
 CPC .............. *G01K 1/08* (2013.01); *G01K 1/024* (2013.01); *G01K 7/22* (2013.01); *G01K 13/00* (2013.01); *G01K 2207/02* (2013.01); *G01K 2207/06* (2013.01); *G01K 2215/00* (2013.01)

(58) Field of Classification Search
 USPC .................................................. 374/163, 208
 See application file for complete search history.

(56) References Cited

U.S. PATENT DOCUMENTS

| | | | | |
|---|---|---|---|---|
| 2008/0259995 A1* | 10/2008 | Kuhn | ........................ | G01K 7/32 374/E1.004 |
| 2015/0168232 A1* | 6/2015 | Chu | ......................... | G01K 1/12 374/208 |
| 2016/0377490 A1* | 12/2016 | Nivala | ...................... | G01K 7/42 374/155 |
| 2017/0122817 A1* | 5/2017 | Willert | .................... | G01K 1/022 |
| 2018/0353003 A1* | 12/2018 | Sabata | ................... | G01K 1/024 |

FOREIGN PATENT DOCUMENTS

WO WO 2016/210356 A 12/2016
WO WO 2019/012324 A1 1/2019

* cited by examiner

*Primary Examiner* — Mirellys Jagan
(74) *Attorney, Agent, or Firm* — Birch, Stewart, Kolasch & Birch, LLP

(57) ABSTRACT

A waterproof thermometer for monitoring a food temperature during a cooking process includes a rechargeable battery for supplying power, a thermal sensor for measuring the food temperatures, and a processing unit for wirelessly transmitting data via an antenna. The waterproof thermometer further includes a first conductive part for containing the thermal sensor, the processing unit, and the rechargeable battery, a first insulating part for containing the antenna, a second insulating part, and a second conductive part. The first insulating part is surrounded by the second insulating part, and separated from the second insulating part by an air filled gap. The first conductive part, the first insulating part and the second conductive part form a first hermetic shell for providing waterproof function. The first conductive part, the second insulating part, and the second conductive part form a second hermetic shell for providing protection to the first insulating part from being damaged.

14 Claims, 11 Drawing Sheets

WATERPROOF THERMOMETER FOR MONITORING FOOD TEMPERATURES DURING COOKING PROCESS

BACKGROUND OF THE INVENTION

1. Field of the Invention

The present invention relates to a thermometer, and more particularly to a waterproof thermometer for monitoring food temperatures during a cooking process.

2. Description of the Related Art

Some foods are prepared according to individual preferences, for example, meats that are served in the form of steaks, roasts, chops, and the like may be cooked rare, medium rare, medium, medium well, or well done. These different cooking preferences are often referred to as "doneness". Beef is one kind of meat that is particularly suitable for different levels of doneness. On the other hand, many individuals prefer to have certain kinds of meat cooked well done. Such well done meats typically include poultry and pork. As such, cooking to an accurate temperature is critical in gourmet cooking to avoid undercooking or overcooking the food To this end, a cook may use a thermometer to accurately measure the temperature of the food being cooked.

Moreover, one kind of thermometer is an electronic thermometer. The electronic thermometer cannot withstand the temperatures inside a cooking vessel, such as an oven or barbeque grill, while the food is being cooked. This is because of temperature limitations of electronics, displays, batteries, and the like. Thus, the electronic thermometers cannot be left inside a cooking vessel during the cooking process. The user must periodically insert the electronic thermometer into the food, obtain a current temperature, and then remove the thermometer prior to further cooking. This is inconvenient and increases the cooking time as an enormous amount of heat is lost during the measurement, and may increase the risk of the food being over cooked if checked too late.

To overcome this disadvantage, some thermometers build the control unit in a separate housing that is placed outside the cooking vessel and is connected to a temperature sensing probe via an electrical wire.

However, the thermometer having the electrical wire between a temperature sensing probe and a control unit has many disadvantages: it is cumbersome during cooking; it cannot be used in rotating cooking vessels, and so forth.

Therefore, it is preferable to have a waterproof wireless thermometer that can be used to measure the internal temperature of a food item during cooking, and wirelessly transmit the measured temperatures to one or more monitoring devices, and can be cleaned by a dishwasher. Furthermore, the conditions become more severe when using the thermometer during a cooking process such as cooking deep fried meat or sous vide meat. Doubtlessly, leaking water, oil or mixture of the two into the thermometer will damage the circuit of the thermometer. In this regard, it is desirable to provide a thermometer capable of meeting strict use conditions.

Accordingly, it is an objective of the present invention to provide a thermometer that can remain waterproof after repeated heating and cooling cycles so that the thermometer can be washed in a dishwasher and can be durably used for various cooking methods, such as deep fried meat, boiled meat or sous vide meat.

SUMMARY OF THE INVENTION

An objective of the present invention is to provide a thermometer that can measure food temperatures during a cooking process and wirelessly transmit the measured temperature data to a computing device so that a user can monitor the food temperatures from the computing device. To achieve the foregoing objective, the thermometer is positioned inside the food throughout the cooking process to monitor temperature and can be used in different types of cooking methods, such as boiled meat, fried chicken, etc. That is, the thermometer can work normally when placed in water or oil.

An objective of the present invention is to provide a wireless thermometer that is durable and remains waterproof after repeated heating and cooling cycles. To this end, this invention proposes a two-layer shell to form a hermetic housing for the thermometer.

Other objectives, advantages, and novel features of the invention will become more apparent from the following detailed description when taken in conjunction with the accompanying drawings.

DETAILED DESCRIPTION OF THE INVENTION

Figure 1:
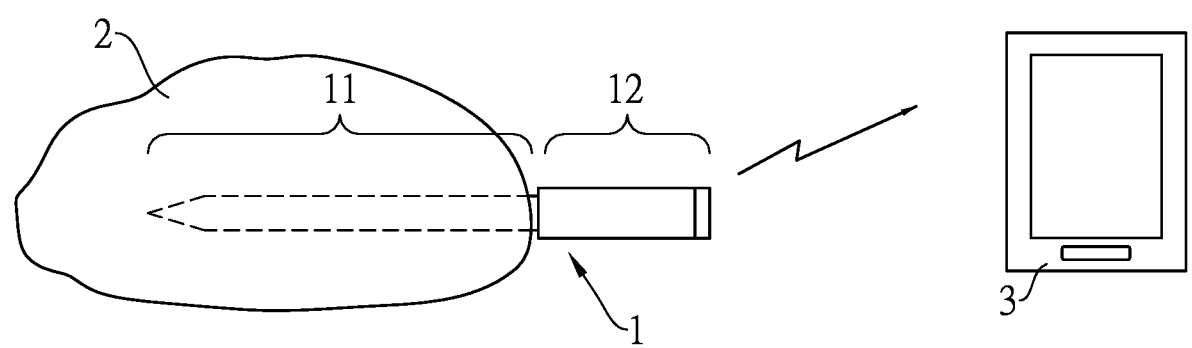
FIG. 1 shows a thermometer inserted into a food item and transmitting a measured temperature data to a computing device.

With reference to FIG. 1, a waterproof thermometer 1 is inserted into food 2 to measure the internal temperature of the food 2, and the waterproof thermometer 1 further transmits thermometer data wirelessly to a computing device 3 based on the measured temperatures. The thermometer data are transmitted using an available wireless technology, for example, Bluetooth technology, in particular, Bluetooth Low Energy (BLE). The user may monitor the food temperatures during a cooking process via the computing device 3. The computing device 3 can be a smartphone, a tablet computer, or any electronic device that is capable of receiving the thermometer data wirelessly, execute a computer program to interpret and analyze the thermometer data, and display the information included in the thermometer data. The waterproof thermometer 1 comprises two portions, wherein a first portion 11 is inserted into the food, a second portion 12 is positioned outside the food, and the second portion 12 is used as the handle of the waterproof thermometer 1 to push the waterproof thermometer 1 into the food 2 or pull the waterproof thermometer 1 out of the food 2.

Figure 2A:
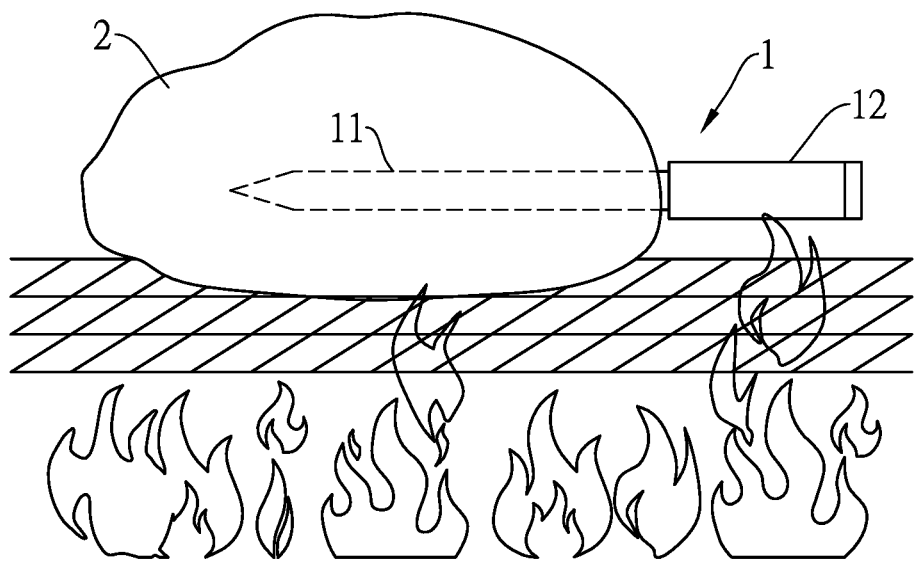
FIG. 2A shows an example of grilled meat.
Figure 2B:
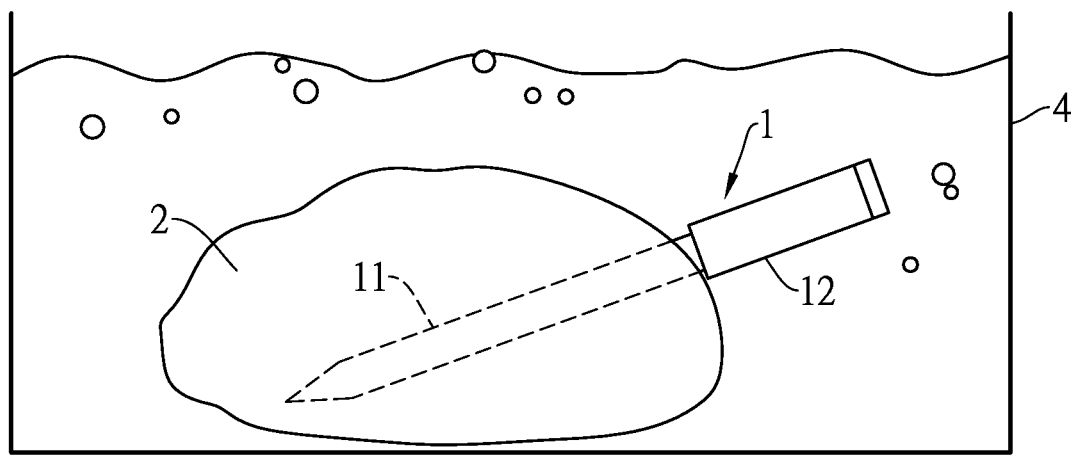
FIG. 2B shows an example of boiled or deep fried meat.

It is preferable that the waterproof thermometer 1 can be used when cooking the food in different cookware, such as grills, ovens, pots, pans, etc., and can be used with different cooking methods such as deep frying, boiling, roasting, sous vide, and the like. FIG. 2A illustrates an example of barbeque in which the flame flashes below the food 2 and therefore the second portion 12 of the waterproof thermometer 1 must be able to withstand instantaneous high temperature, and in some cases, the temperature may be as high as 800° C. FIG. 2B shows another example of meat being deep fried or boiled in a pot 4, the meat 2 and the waterproof thermometer 1 are both placed in the oil or the water, therefore the waterproof thermometer 1 must be waterproof to avoid damage during the cooking process.

Figure 3A:
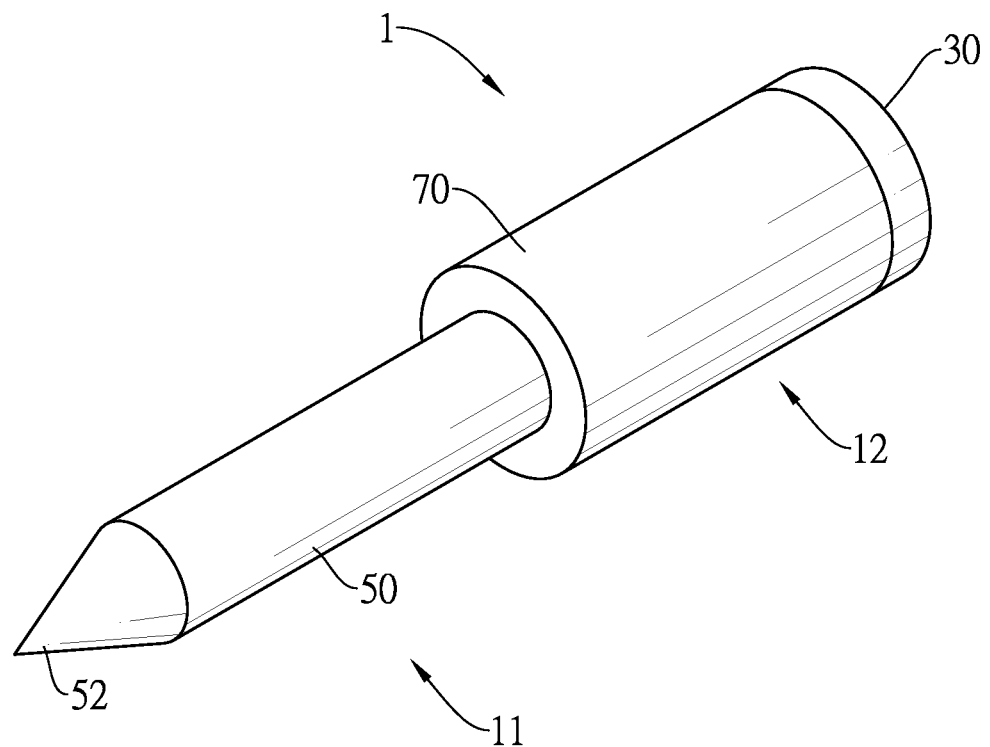
FIG. 3A is schematic view of a thermometer.
Figure 3B:
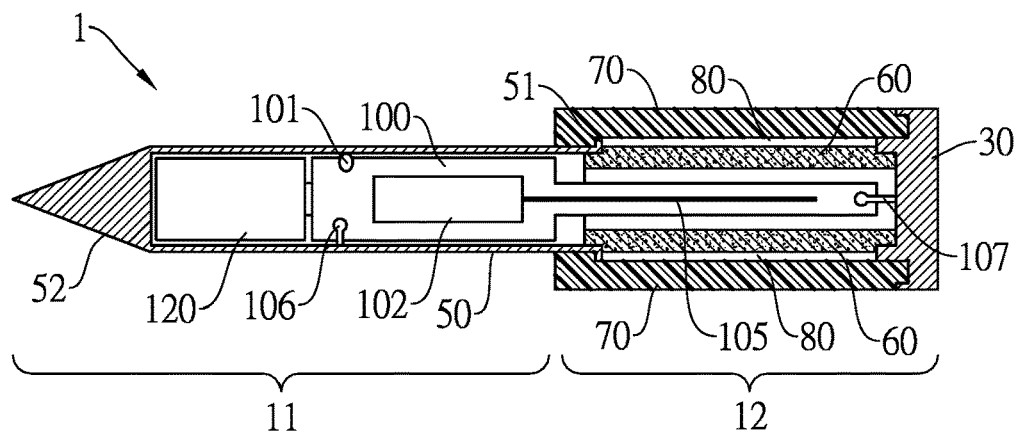
FIG. 3B is a cross sectional view of the thermometer having at least one thermal sensor inside the first conductive part.

In an embodiment as depicted in FIG. 3A and FIG. 3B, the waterproof thermometer 1 comprises a circuit board 100 on which further includes at least one thermal sensor 101, a processing unit 102, and an antenna 105, where the thermal sensor 101 is configured to measure the internal temperature of the food 2, the processing unit 102 electrically connected to the thermal sensor 101 is configured to receive the measured temperature value from the thermal sensor 101, convert the measured temperature value to thermometer data, and transmit the thermometer data wirelessly via the antenna 105. The processing unit 102 further includes a processor and an emitter (not shown in the figure), wherein the processor is configured to execute a computer program to convert the output signal of the thermal sensor 101 to a temperature value, and further to generate thermometer data which may include temperature value, the identity of the waterproof thermometer 1, the software version number of the computer program of the waterproof thermometer 1, and the like. The emitter is configured to transmit the thermometer data via the antenna 105. In an embodiment, a Bluetooth chip serves as the emitter. In another embodiment, the processor and the emitter are integrated into a Bluetooth chip. The waterproof thermometer 1 also comprises a battery 120 electrically connected to the circuit board 100 and is used as a power supply of the waterproof thermometer 1. The battery 120 is a high temperature rechargeable battery that can operate at a high temperature of at least 100° C. The thermal sensor 101 and the temperature sensitive components such as the processing unit 102 and the battery 120 are located inside the first portion 11 to be inserted to the food during cooking, and thus are protected by the food 2 to avoid overheating as the internal temperature of the food 2 is typically limited, for example, between 60° C. and 100° C. While the antenna 105 electrically connected to the processing unit 102 is located inside the second portion 12, the antenna 105 may be a monopole antenna printed on the circuit board 100, a chip antenna mounted on the circuit board 100, or a rod shaped conductor electrically connected to the circuit board 100. The thermal sensor 101 may be a resistance temperature detector (RTD) or an NTC type thermistor.

Figure 3C:
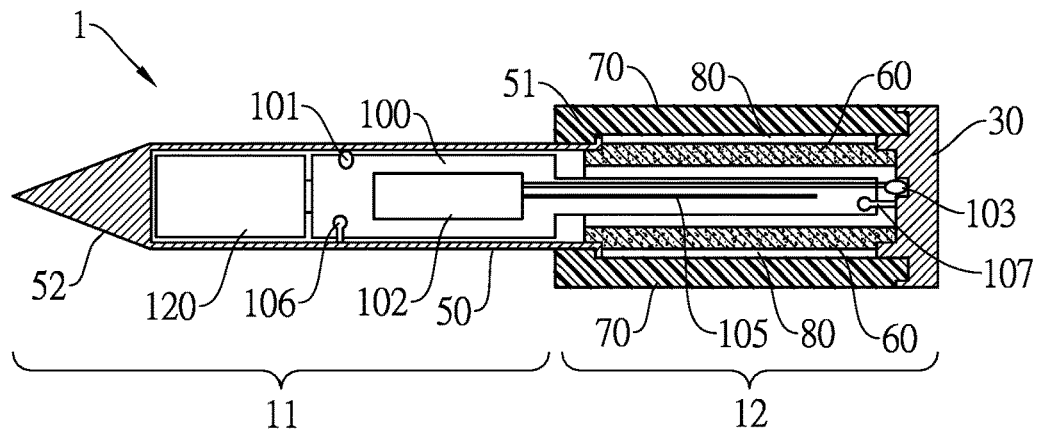
FIG. 3C is a cross sectional view of the thermometer having at least one thermal sensor and an ambient thermal sensor.

As described above, the waterproof thermometer 1 measures the food temperatures and wirelessly transmits the measured food temperatures to the computing device 3 so that one can monitor food temperatures from the computing device 3 during cooking. However, in some applications, it's required to monitor the cooking status of the cooking equipment and further to control the cooking equipment. In these cases, the ambient temperatures need to be monitored as well. In other embodiments, as illustrated in FIG. 3C, the waterproof thermometer 1 further comprises an ambient thermal sensor 103 electrically connected to the processing unit 102 and located in the second portion 12 to measure the ambient temperatures around the second portion 12, i.e., the ambient temperatures near the food. The ambient thermal sensor 103 may be a resistance temperature detector (RTD) or an NTC type thermistor.

For simplicity in description, the waterproof thermometer 1 described in the rest of this document comprises at least one thermal sensor 101 and an ambient thermal sensor 103. However, it should be understood that the techniques described below can be easily applied to thermometers without the ambient thermal sensor.

The waterproof thermometer 1 further comprises a first conductive part 50, a first insulating part 60 and a second insulating part 70. The first conductive part 50 constitutes the main body of the first portion 11 of the waterproof thermometer 1 and extends into the second portion 12 of the waterproof thermometer 1. The first insulating part 60 and the second insulating part 70 are located at the second portion 12 of the waterproof thermometer 1.

The inside of the first conductive part 50 is hollow, wherein one end of the first conductive part 50 is a tip end 52 to facilitate easy insertion of the waterproof thermometer 1 into the food 2, and the other end opposite to the tip end 52 is an open end 51. The open end 51 is within the second portion 12 of the waterproof thermometer 1 and is connected to the first insulating part 60 and the second insulating part 70 at different locations.

In addition, the battery 120, the thermal sensor 101, and the processing unit 102 are positioned inside the first conductive part 50, particularly the part of the first conductive part 50 located in the first portion 11 of the waterproof thermometer 1, while the antenna 105 and the ambient thermal sensor 103 are positioned inside the first insulating part 60. A first conductive unit 106 is further provided to form a conductive path between the first conductive part 50 and the circuit board 100 such that the first conductive part 50 functions as a ground plane of the electronic circuit and serves as the cathode for charging the battery 120. Specifically, one end of the first conductive unit 106 is soldered to a node of the circuit on the circuit board 100, and the other end is in contact with the inner surface of the first conductive part 50. The first conductive unit 106 may be a conductive spring, a conductive elastic sheet, or the like.

Figure 4A:
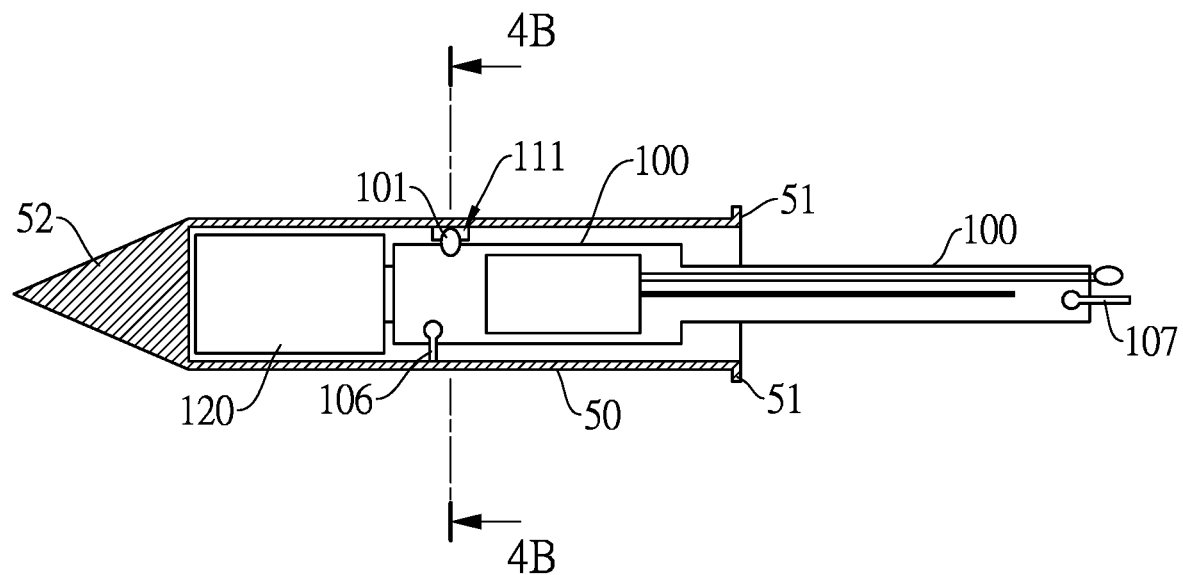
FIG. 4A shows that the thermal sensor and the first conductive unit are connected to the circuit board and in contact with the first conductive part.
Figure 4B:
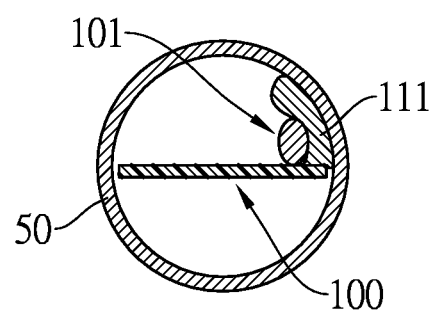
FIG. 4B is a cross sectional view of FIG. 4A, along sectional line 4B-4B

In an embodiment as illustrated in FIG. 4A, one end of the battery 120 abuts against the inner wall of the first conductive part 50 and two electrodes on the other end are connected to the circuit board 100. Further, the thermal sensor 101 mounted on the circuit board 100 is arranged to contact the inner surface of the first conductive part 50. In a further embodiment, FIG. 4B is a cross sectional view taken along the sectional line 4B-4B shown in FIG. 4A, as depicted in FIG. 4A and FIG. 4B, a thermal pad 111 may be applied between the thermal sensor 101 and the inner surface of the first conductive part 50 to provide better thermal conduction from the first conductive part 50 to the thermal sensor 101.

Figure 3D:
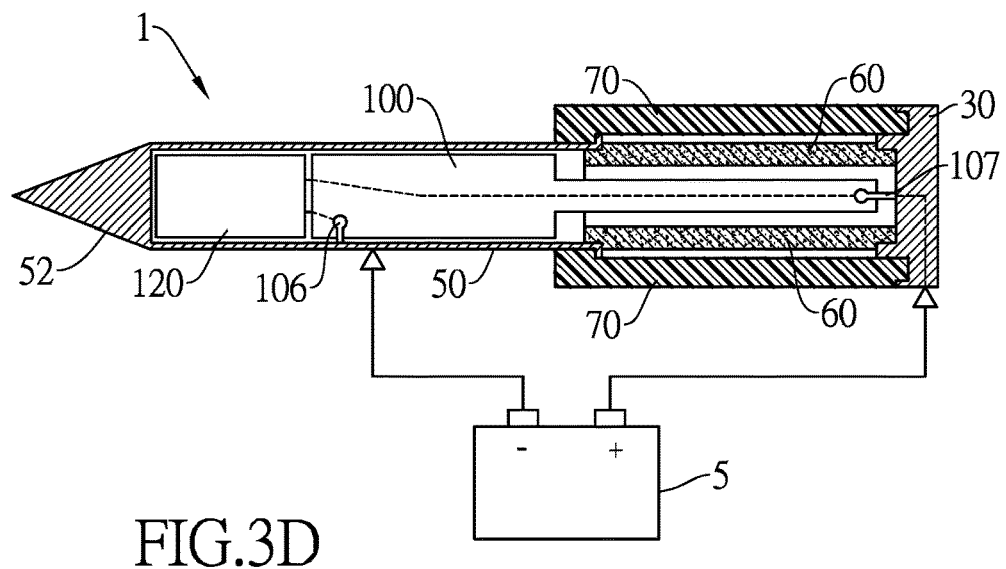
FIG. 3D shows that the battery is charged by an external power.

As the battery 120 is rechargeable, the waterproof thermometer 1 further comprises a second conductive part 30 used as the anode for charging the battery 120. To charge the battery 120, a second conductive unit 107 is provided to form a conductive path between the circuit board 100 and the second conductive part 30. Specifically, one end of the second conductive unit 107 is soldered to or in contact with a node of the circuit on the circuit board 100, and the other end of the second conductive unit 107 is in contact with or connected to the second conductive part 30. Depending on the mechanical structure of the second conductive part 30, the second conductive unit 107 may be a conductive spring, a conductive elastic sheet, a conductive clip, or a wire. The battery 120 can thereby be charged by an external power supply 5, such as a battery charger, via the first conductive part 50 and the second conductive part 30 as illustrated in FIG. 3D. In addition, when the ambient thermal sensor 103 is employed, the ambient thermal sensor 103 is arranged in contact with the second conductive part 30 to measure the temperature of the second conductive part 30.

Figure 5A:
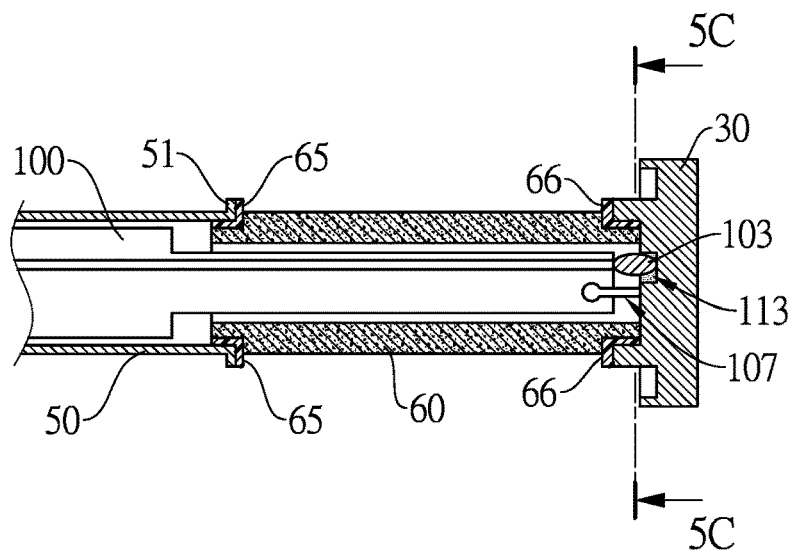
FIG. 5A is part of the first hermetic shell having gaskets to form a moisture barrier.
Figure 5B:
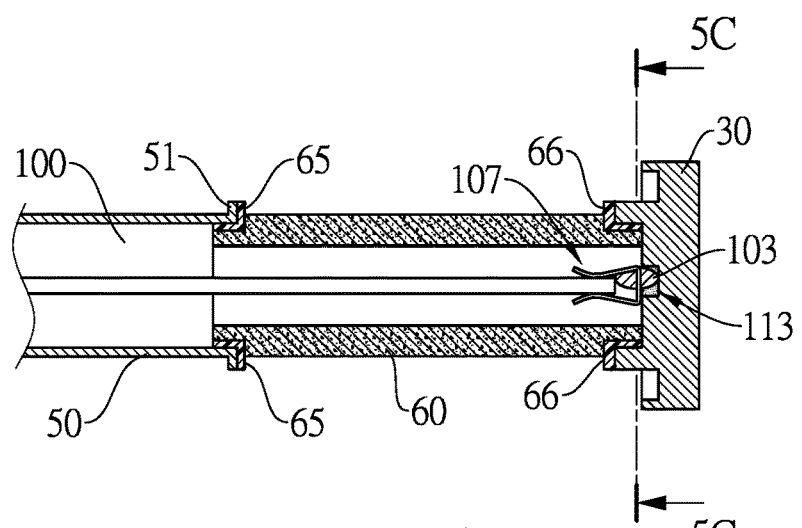
FIG. 5B is another cross sectional view of FIG. 5A.
Figure 5C:
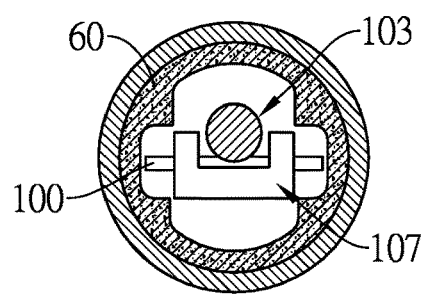
FIG. 5C is a cross sectional view of FIG. 5A, along sectional line 5C-5C.
Figure 5D:
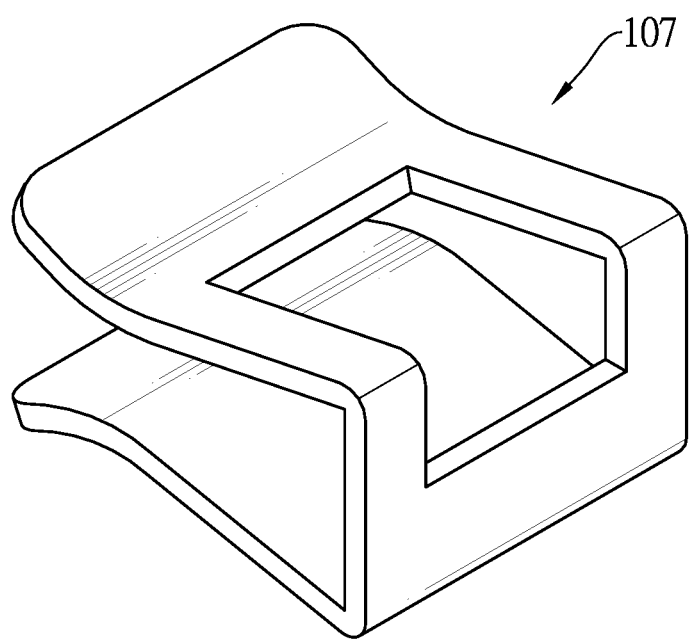
FIG. 5D is a schematic view of a conductive clip.

In one embodiment, the second conductive unit 107 is a conductive clip as shown in FIG. 5B, which is the cross sectional view 90 degrees rotated from the cross sectional view of FIG. 5A. First, the conductive clip 107 is pushed into an edge of the circuit board 100 where a copper foil is printed near the edge to contact the conductive clip 107. When connecting the first insulating part 60 to the second conductive part 30, the conductive clip 107 is further pressed into the circuit board 100 to contact the copper foil and so the conductive clip 107 is firmly electrically connected to the circuit on the circuit board 100 and is in close contact with the second conductive part 30. FIG. 5C shows a cross sectional view taken along the sectional line 5C-5C shown in FIG. 5A, FIG. 5B, and FIG. 5D shows a schematic view of the conductive clip 107, where the conductive clip 107 has a gap so that the ambient thermal sensor 103 can protrude from the conductive clip 107 to contact the second conductive part 30. In an embodiment as shown in FIG. 5A, FIG. 5B, FIG. 5C, and FIG. 5D, the first insulating part 60 is a cylinder having a non-cylindrical cavity to provide sufficient robustness of the first insulating part 60.

In another embodiment, to provide better thermal conduction from the second conductive part 30 to the ambient thermal sensor 103, before connecting the second conductive part 30 to the first insulating part 60, the ambient thermal sensor 103 is positioned into a hole on the inner surface of the second conductive part 30. In an embodiment as shown in FIG. 5B and FIG. 5C, a thermally conductive gel 113 is further applied to the hole before placing the ambient thermal sensor 103 into the hole so that the ambient thermal sensor 103 is actually covered by the thermally conductive gel 113 and in contact with the second conductive part 30 through the thermally conductive gel 113.

In an embodiment of the invention, the first conductive part 50 and the second conductive part 30 are made of stainless steel, the first insulating part 60 is made of high temperature thermoplastic, such as PEEK that can withstand a high temperature of at least 200° C., and the second insulating part 70 is made of ceramic or glass capable of withstanding a continuous high temperature of at least 600° C. for more than 60 minutes and an instantaneous high temperature of at least 800° C. for more than 10 seconds.

Figure 6A:
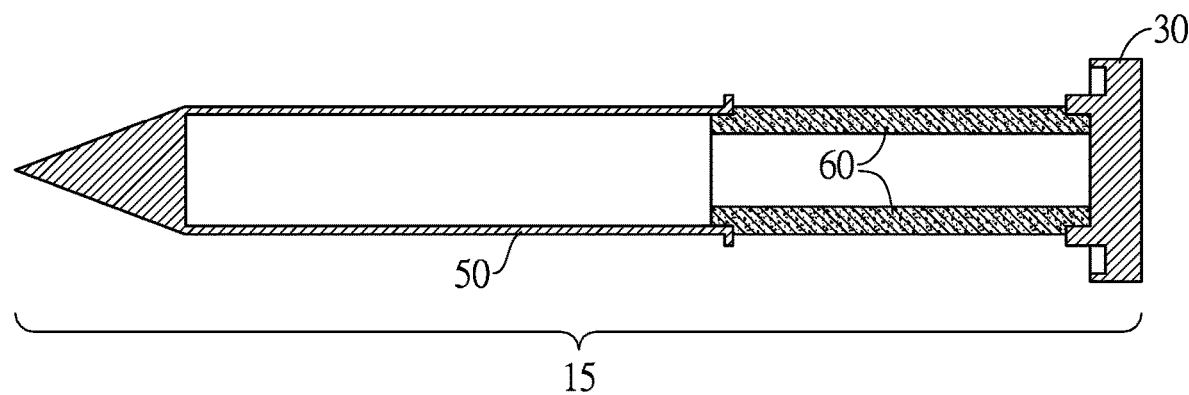
FIG. 6A shows the first hermetic shell.

One end of the first insulating part 60 is connected to the open end 51 of the first conductive part 50, and the other end is connected to the second conductive part 30. Therefore, the first conductive part 50, the first insulating part 60, and the second conductive part 30 form a first hermetic shell 15 of the waterproof thermometer 1 as illustrated in FIG. 6A. The primary function of the first hermetic shell 15 is to prevent water from entering the first conductive part 50, thereby preventing damage to the battery 120 and the electronic components on the circuit board 100.

Figure 6B:
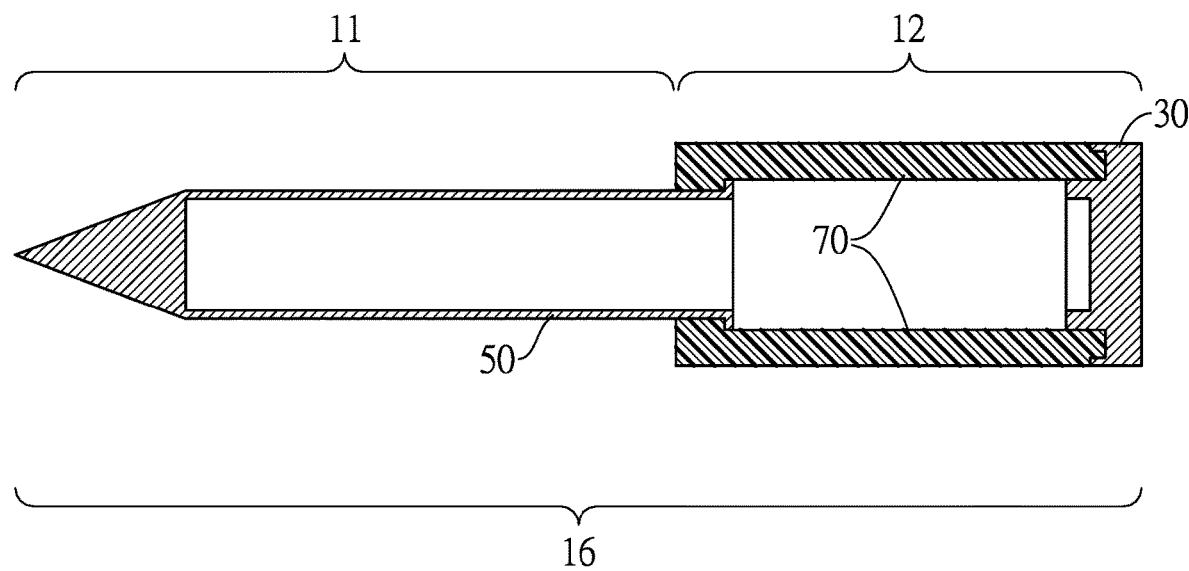
FIG. 6B shows the second hermetic shell.

Further, one end of the second insulating part 70 is connected to the open end 51 of the first conductive part 50, and the other end is connected to the second conductive part 30. Therefore, the first conductive part 50, the second insulating part 70, and the second conductive part 30 form a second hermetic shell 16 of the waterproof thermometer 1 as illustrated in FIG. 6B. The purpose of deploying the second hermetic shell 16 is to function as the outer layer of the second portion 12 to protect the first insulating part 60 from direct exposure to high temperature environments, in particular, instantaneous high temperatures caused by flames as illustrated in FIG. 2A. In other words, the second insulating part 70 protects the first insulating part 60 from damage caused by an instantaneous high temperature, which is much higher than the highest temperature that the first insulating part 60 can withstand. The waterproof function, which is the main function of the first insulating part 60, can remain normal after the waterproof thermometer 1 is repeatedly used for cooking, such as grilling. The waterproof function will fail if the first insulating part 60 is damaged caused by temperatures higher than the highest operating temperature of the first insulating part 60.

As shown in FIG. 3B, FIG. 6A, and FIG. 6B, the first hermetic shell 15 and the second hermetic shell 16 are overlapped at the first conductive part 50 and the second conductive part 30, whilst the second insulating part 70 is located outside the first insulating part 60 and surrounds the first insulating part 60 such that the second insulating part 70 forms a protective layer for the first insulating part 60 to prevent the first insulating part 60 from being heated directly. Furthermore, the first insulating part 60 and the second insulating part 70 are separated by an air filled gap 80 such that the first insulating part 60 and the second insulating part 70 are not in contact with each other. The air filled gap 80 is provided to slow down heat transfer from the outside of the second insulating part 70 to the first insulating part 60, and this is because the thermal conductivity of the air filled in the air filled gap 80 is much lower than the thermal conductivity of the second insulating part 70. For example, the thermal conductivity of air at room temperature is about 0.026 W/mK and the thermal conductivity of the aluminum oxide ceramic is typically in the range of 18 to 36 W/mK. In this regard, the second insulating part 70 together with the air filled gap 80 provides protection to the first insulating part 60 from damage resulted from transient high temperatures that may be caused by a sudden and intense heat, such as flames, and as described above, may be as high as 800° C. In one embodiment of the invention, the distance between the first insulating part 60 and the second insulating part 70 is at least 0.15 mm, and this short distance can provide additional protection for the first insulating part 60 from damage when the second portion 12 of the waterproof thermometer 1 is heated directly by the flash flame or used in a searing process for a short period of time.

A common practice of joining two parts together is to use an adhesive. When applied to the waterproof thermometer 1, this requires the use of suitable adhesive that can withstand continuous operation at high temperatures. However, most adhesives can only be effective below a certain temperature and use in environments above this temperature will cause the adhesive to deteriorate and create gaps in the joint portion even if the adhesiveness remains effective. When this happens, water may enter at the joint portion. Another common practice of joining two parts tightly together is to join two parts by an interference fit. Again, waterproofing may fail after operating in a high temperature environment several times. This is because the coefficients of thermal expansion of the two different parts joined together by the interference fit are usually different, and after several operations at high temperatures, such difference may cause gaps in the joint portion and result in water entering.

Figure 7:
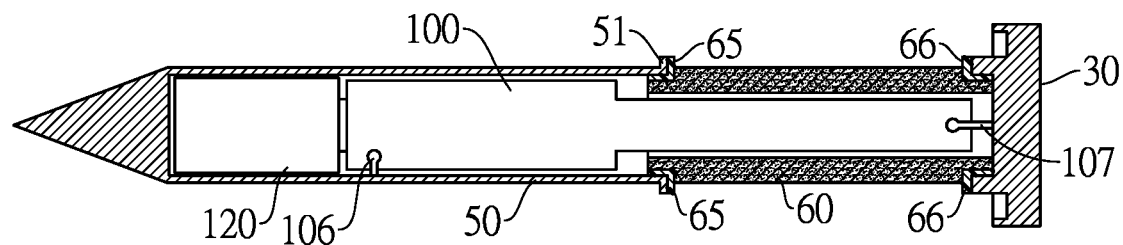
FIG. 7 is the first hermetic shell having electronics inside and moisture barriers at the joint portions.

To overcome the aforementioned problems, the enclosure of the second portion 12 is formed by a combination of the above two approaches. In particular, before connecting the first insulating part 60 to the first conductive part 50, a heat resistant sealant having high ductility and elongation, such as acetoxy silicone rubber, is applied to an end of the first insulating part 60. The first insulating part 60 is then connected to the open end 51 of the first conductive part 50 by an interference fit. With reference to FIG. 5A, the heat resistant sealant forms a first gasket 65 between the joint portion of the first insulating part 60 and the first conductive part 50 for preventing water from entering the first hermetic shell 15. Further, the same heat resistant sealant is applied to the other end of the first insulating part 60. The first insulating part 60 is then connected to the second conductive part 30 by an interference fit. Similarly, the heat resistant sealant forms a second gasket 66 between the joint portion of the first insulating part 60 and the second conductive part 30 for preventing water from entering into the first hermetic shell 15. The ductility of the first gasket 65 and the second gasket 66 will fill the heat resistant sealant into the gaps in the joint portions of both the first insulating part 60 and the first conductive part 50, and the first insulating part 60 and the second conductive part 30. As such, the first gasket 65 and the second gasket 66 form a moisture barrier, respectively, as illustrated in FIG. 7, to prevent water from entering the first hermetic shell 15. Therefore, the first hermetic shell 15 can maintain waterproof function as long as the heat resistant sealant is used within its operating temperatures.

In an embodiment of the present invention, the heat resistant sealant forming the first gasket 65 and the second gasket 66 can withstand continuous high temperatures of at least 200° C. and even higher intermittent temperatures, therefore it can provide sufficient waterproof function when the temperature at the surface of the first insulating part 60 is below 200° C. In this case, the waterproof thermometer 1 can be used during a cooking process without losing waterproof function as long as the cooking temperature does not exceed 200° C. In addition, as stated above, since the second insulating part 70 together with the air filled gap 80 forms a protective layer to block high temperatures, the second portion 12 of the waterproof thermometer 1 can even be exposed to flash flames or a searing process for a short time without causing damage and loss of waterproof function.

Figure 8A:
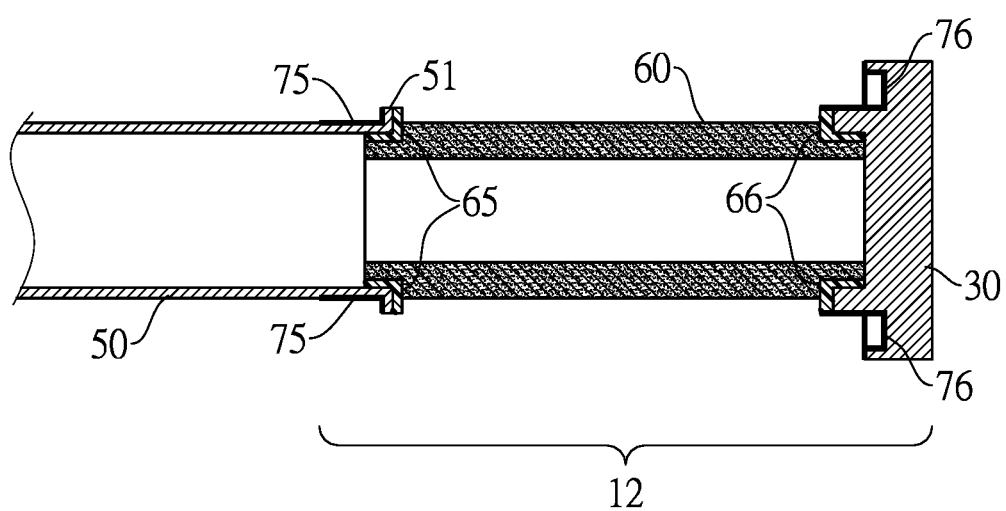
FIG. 8A shows that an adhesive is applied to the first conductive part and the second conductive part.
Figure 8B:
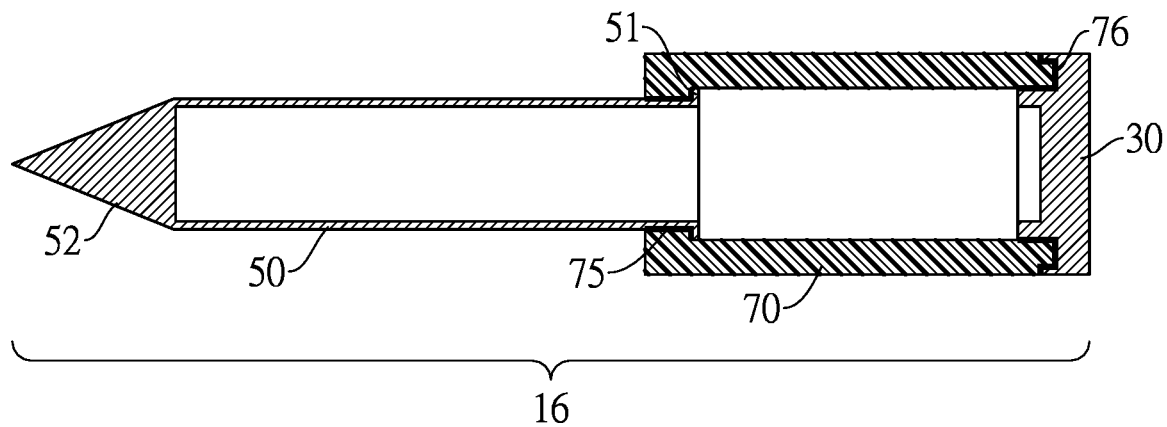
FIG. 8B shows applying the adhesive to form the second hermetic shell.
Figure 8C:
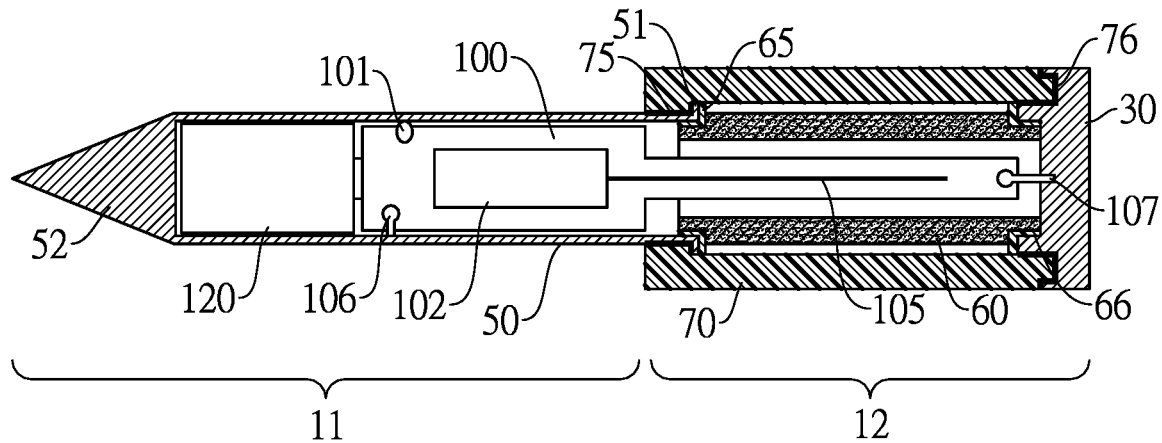
FIG. 8C is a cross sectional view of the thermometer.

Furthermore, as shown in FIG. 8A before connecting the second insulating part 70 to the first conductive part 50 and the second conductive part 30 to form the second hermetic shell 16, a high temperature resistant adhesive is applied to the first contact portion 75 on the outer surface of the first conductive part 50, where the first contact portion 75 is adjacent to the open end 51. The same adhesive is also applied to the second contact portion 76 on the second conductive part 30, where the second contact portion 76 is on the outer edge of the inner surface of the second conductive part 30 to be in contact with the second insulating part 70. The adhesive covering the first contact portion 75 and the second contact portion 76 is used to tightly connect the second insulating part 70 to the first conductive part 50 and the second conductive part 30, thereby forming the second hermetic shell 16 and thus the waterproof thermometer 1 as shown in FIG. 8B and FIG. 8C, respectively. Further referring to FIG. 8C, the second portion 12 includes a two-layer shell composed of the first insulating part 60 and the second insulating part 70. The two-layer shell is a part of the first hermetic shell 15 and the second hermetic shell 16 and serves as a high temperature resistant layer having a waterproof function.

In an embodiment of the invention, the adhesive can be continuously exposed to a high temperature of at least 200° C., and even much higher temperatures for a short period of time. This ensures that when the waterproof thermometer 1 is used during cooking, the second portion 12 of the waterproof thermometer 1 can be placed in a cooking device with cooking temperatures up to 200° C., and a much higher temperature for a short time. Note that when the second portion 12 of the waterproof thermometer 1 is continuously exposed to a high temperature environment up to 200° C., or an instantaneous temperature much higher than 200° C., the temperature on the surface of the first insulating part 60 is usually lower than 200° C. This is because, as described above, the protection layer formed by the second insulating part 70 and the air filled gap 80 will actually lower the temperature to some extent. Further, as the temperature inside the food 2 during cooking is generally lower than the temperature outside the food 2, according to the principle of thermal conduction, the temperature difference between the first conductive part 50 and the first insulating part 60 will cause heat transfer from the interior of the first insulating part 60 to the interior of the first conductive part 50. As such, the temperature on the surface of the first insulating part 60 is further lowered. This ensures that during cooking, the first insulating part 60, the first gasket 65 and the second gasket 66 work with in the operating temperature of the respective materials so that the waterproof function can be maintained. In another embodiment, if both the first insulating part 60 and the heat resistant sealant can withstand temperatures higher than 200° C., such as 300° C., an adhesive with the highest operating temperature of at least 300° C. may be selected so that the waterproof thermometer 1 can be used in a cooking device with cooking temperatures up to 300° C. without losing the waterproof function.

In another embodiment, the open end 51 of the first conductive part 50 forms a bell mouth. One advantage of deploying a bell mouth at the open end 51 of the first conductive part 50 is to serve as a spacer so that the second insulating part 70 can be easily aligned during the manufacturing process to ensure that the air filled gap 80 between the first insulating part 60 and the second insulating part 70 is at least 0.15 mm apart. The other advantage is that the bell mouth actually serves as a blockage that can prevent the adhesive from flowing from the first contact portion 75 into the air filled gap 80 during the manufacturing process. When the adhesive flows into the air filled gap 80, the amount of adhesive on the first contact portion 75 will inevitably decrease, thereby reducing the tightness of the connection between the second insulating part 70 and the first conductive part 50. Further, when the adhesive flows into the air filled gap 80 and covers part of the first insulating part 60 surrounding the antenna 105, the adhesive may become an obstacle to the radio frequency signal (RF signal) thereby reducing the signal strength of the RF signal transmitted by the antenna 105. This is because the composite forming the adhesive usually contains materials that may block the RF signal to some extent.

While the present invention has been particularly shown and described with reference to preferred embodiments, it will be understood by those skilled in the art that various changes in the form and details may be done without departing from the spirit and scope of the present invention. The foregoing description of the embodiments is, therefore, to be considered in all respects as illustrative and not restrictive, with the scope of the invention being delineated by the appended claims and their equivalence.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A waterproof thermometer for monitoring food temperatures during a cooking process, comprising:
    a first portion, comprising:
        a battery; and
        a circuit board, configured to be electrically connected to the battery, and comprising at least one thermal sensor and a processing unit; wherein the thermal sensor is configured to measure the food temperatures, and the processing unit is electrically connected to the thermal sensor; and
    a second portion, comprising an antenna; wherein the second portion is connected to the first portion, and the antenna is electrically connected to the processing unit of the circuit board;
    wherein the processing unit is configured to convert the food temperatures measured by the thermal sensor to thermometer data and wirelessly transmit the thermometer data via the antenna; and
    wherein the second portion further comprises a two-layer shell which forms a moisture barrier to prevent water from entering the waterproof thermometer;
    wherein the waterproof thermometer further comprises:
        a first conductive part; wherein a part of the first conductive part is located in the first portion, and another part of the first conductive part is located in the second portion;
        a first insulating part, configured to be connected to the first conductive part, and located in the second portion; wherein the antenna is located inside the first insulating part;
        a second insulating part, configured to be connected to the first conductive part, located in the second portion, and further arranged to surround the first insulating part; and
        a second conductive part, configured to be electrically connected to the circuit board, located in the second portion, and further connected to the first insulating part and the second insulating part;
    wherein the first insulating part and the second insulating part form the two-layer shell of the second portion.

2. The waterproof thermometer as claimed in claim 1, further comprising:
    a first gasket, configured to be mounted between the first insulating part and the first conductive part; and
    a second gasket, configured to be mounted between the first insulating part and the second conductive part;
    wherein the first gasket and the second gasket are a heat resistant sealant, and the first gasket and the second gasket are configured to be a moisture barrier of the second portion.

3. The waterproof thermometer as claimed in claim 1, further comprising:
    two high temperature resistant adhesives, configured to be respectively mounted between the first conductive part and the second insulating part, and between the second insulating part and the second conductive part to tightly join the first portion and the second portion together, and to form a hermetic shell of the waterproof thermometer.

4. A waterproof thermometer for monitoring food temperatures during a cooking process, comprising:
    a first portion, comprising:
        a battery; and
        a circuit board, configured to be electrically connected to the battery, and comprising at least one thermal sensor and a processing unit wherein the thermal sensor is configured to measure the food temperatures, and the processing unit is electrically connected to the thermal sensor; and
    a second portion, comprising an antenna; wherein the second portion is connected to the first portion, and the antenna is electrically connected to the processing unit of the circuit board;
    wherein the processing unit is configured to convert the food temperatures measured by the thermal sensor to thermometer data and wirelessly transmit the thermometer data via the antenna; and
    wherein the second portion further comprises a two-layer shell which forms a moisture barrier to prevent water from entering the waterproof thermometer;
    wherein the waterproof thermometer further comprises:
        a first conductive part, comprising two ends; wherein one of the two ends is a tip end, and the other one of the two ends is an open end; wherein the thermal sensor, the processing unit and the battery are positioned inside the first conductive part;
        a first insulating part, configured to be connected to the first conductive part; wherein the antenna is located inside the first insulating part;
        a second insulating part, configured to be connected to the first conductive part and surrounding the first insulating part; and
        a second conductive part, configured to be electrically connected to the circuit board, and further connected to the first insulating part and the second insulating part;
    wherein the first conductive part, the first insulating part, and the second conductive part form a first hermetic shell of the waterproof thermometer; and
    wherein the first conductive part, the second insulating part, and the second conductive part form a second hermetic shell of the waterproof thermometer.

5. The waterproof thermometer as claimed in claim 4, further comprising:
    a first gasket, configured to be mounted between the first insulating part and the first conductive part; and
    a second gasket, configured to be mounted between the first insulating part and the second conductive part;

wherein the first gasket and the second gasket are a heat resistant sealant, and the first gasket and the second gasket are configured to be a moisture barrier of the first hermetic shell.

6. The waterproof thermometer as claimed in claim 4, wherein the second insulating part is configured to withstand a continuous high temperature of at least 600° C. for more than 60 minutes and an instantaneous high temperature of at least 800° C. for more than 10 seconds.

7. The waterproof thermometer as claimed in claim 4, wherein the first insulating part and the second insulating part are separated by at least 0.15 mm.

8. The waterproof thermometer as claimed in claim 4, wherein the first insulating part and the second insulating part are separated by an air filled gap.

9. The waterproof thermometer as claimed in claim 4, wherein the open end of the first conductive part forms a bell mouth;
  wherein the bell mouth of the first conductive part is configured to be a spacer between the first insulating part and the second insulating part.

10. The waterproof thermometer as claimed in claim 4, further comprising:
  an ambient thermal sensor, configured to measure ambient temperatures external to the food; wherein the ambient thermal sensor is mounted inside the first insulating part, and is in contact with the second conductive part.

11. The waterproof thermometer as claimed in claim 4, further comprising:
  two high temperature resistant adhesives, configured to be respectively mounted between the first conductive part and the second insulating part, and between the second insulating part and the second conductive part, and to form the second hermetic shell of the waterproof thermometer.

12. The waterproof thermometer as claimed in claim 4, wherein the tip end of the first conductive part is to be positioned in a food.

13. The waterproof thermometer as claimed in claim 4, further comprising:
  a first conductive unit, configured to form a conductive path between the circuit board and the first conductive part;
  a second conductive unit, configured to form a conductive path between the circuit board and the second conductive part;
  wherein the first conductive unit is electrically connected to the circuit board and in contact with the first conductive part;
  wherein the second conductive unit is electrically connected to the circuit board and in contact with the second conductive part.

14. The waterproof thermometer as claimed in claim 13, wherein the second conductive unit is in contact with a copper foil on the circuit board.

* * * * *